Aug. 28, 1945.  C. D. THOMS  2,383,522
APPARATUS FOR TREATING LIQUIDS
Filed Dec. 4, 1940  5 Sheets-Sheet 4
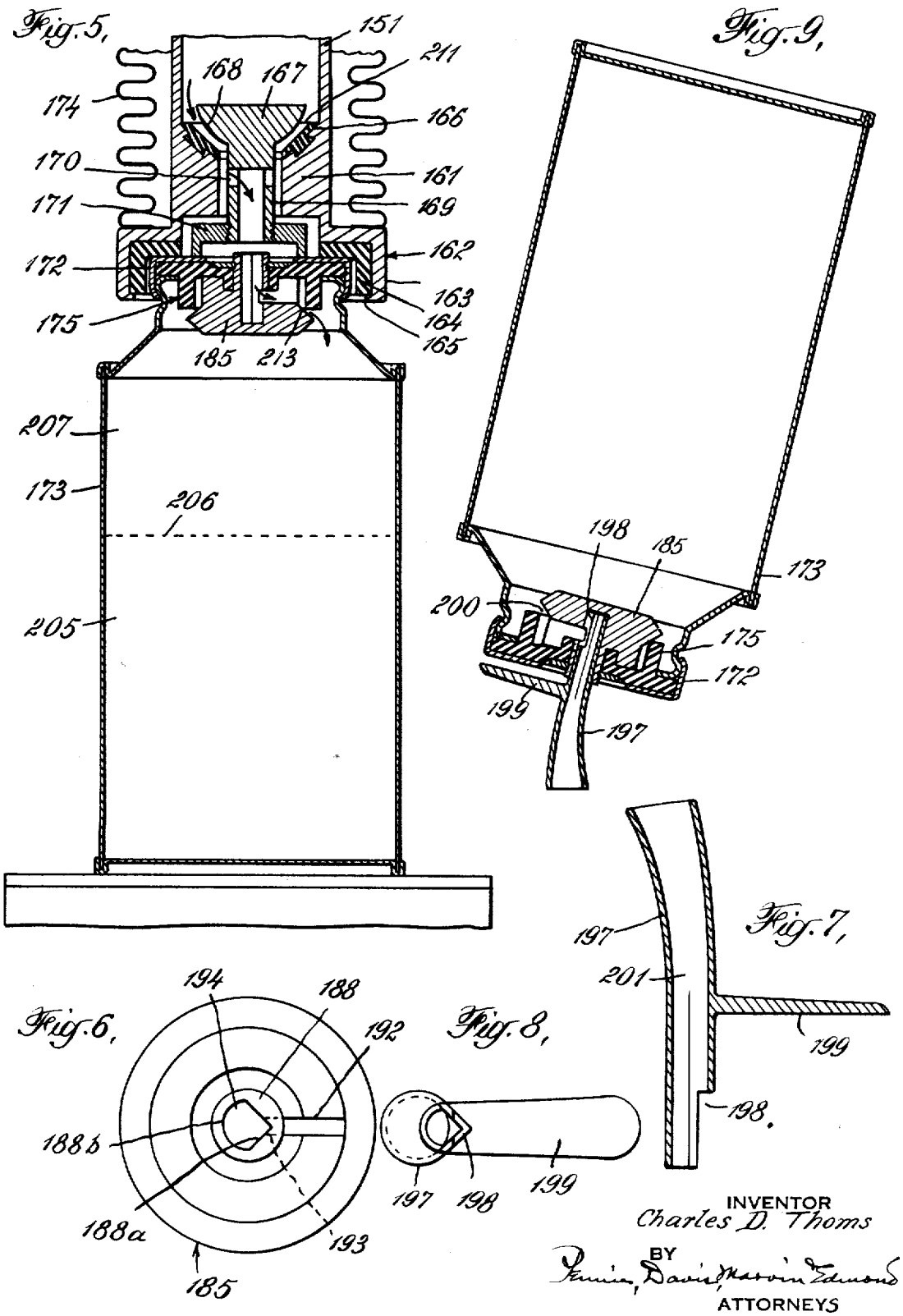

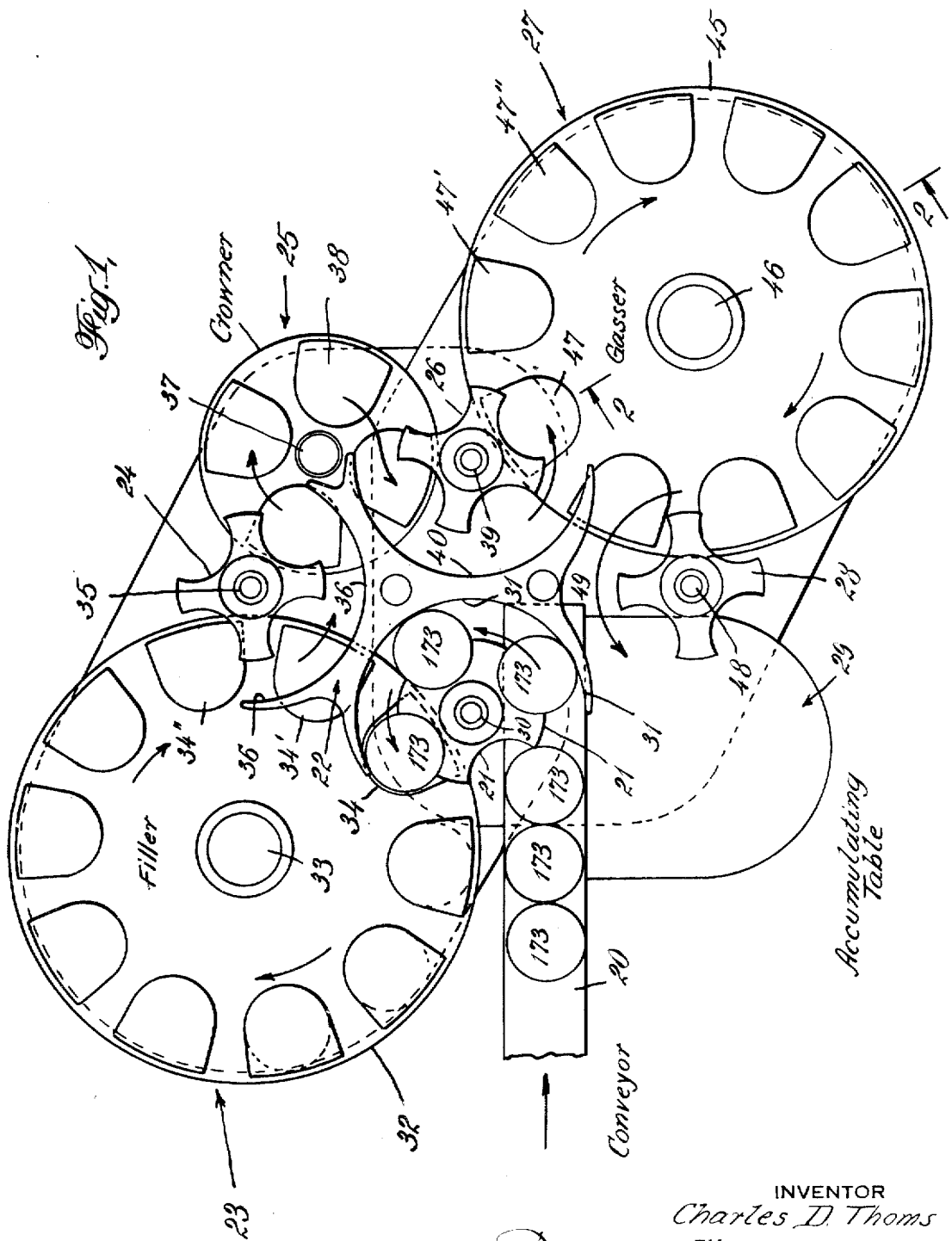

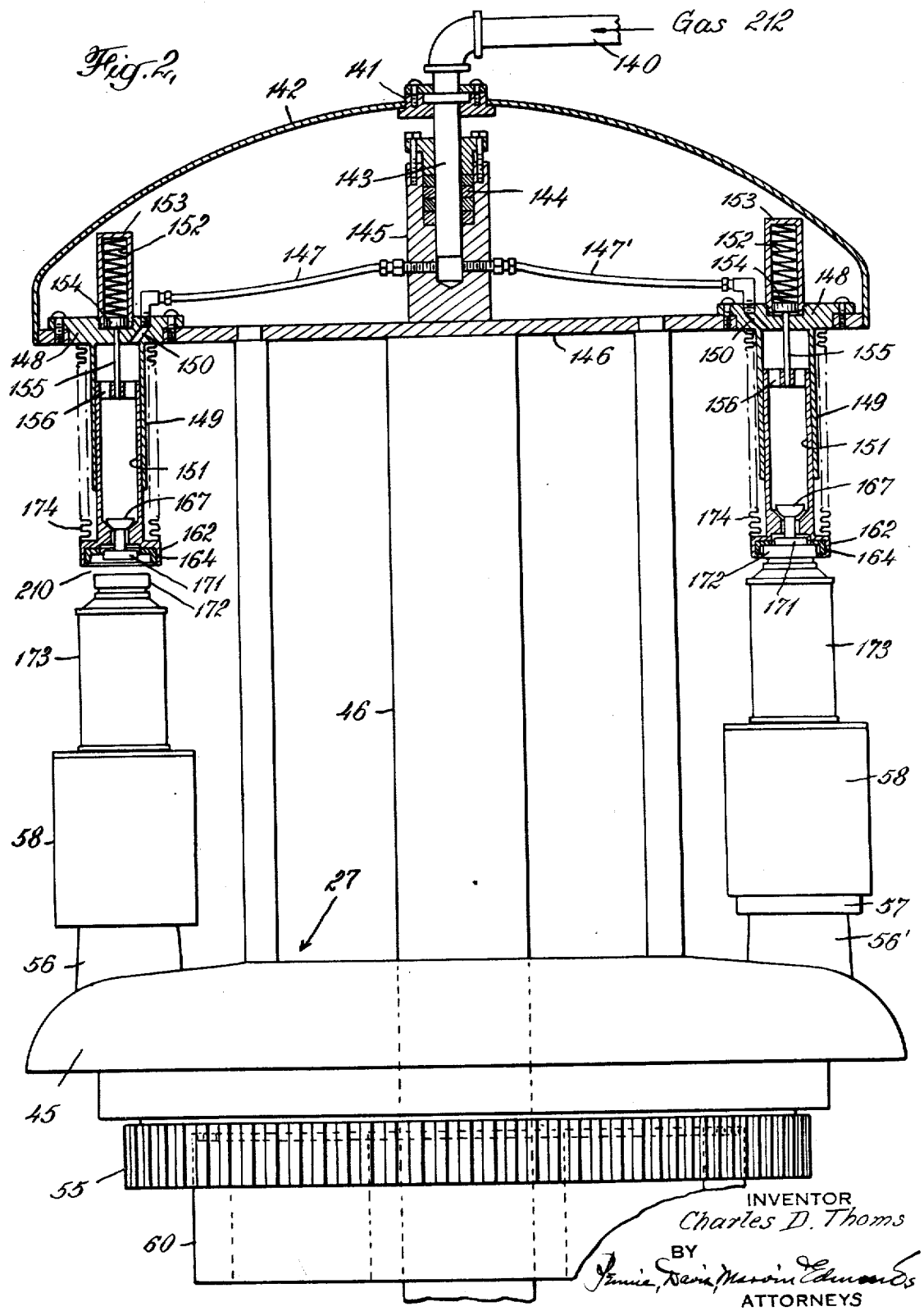

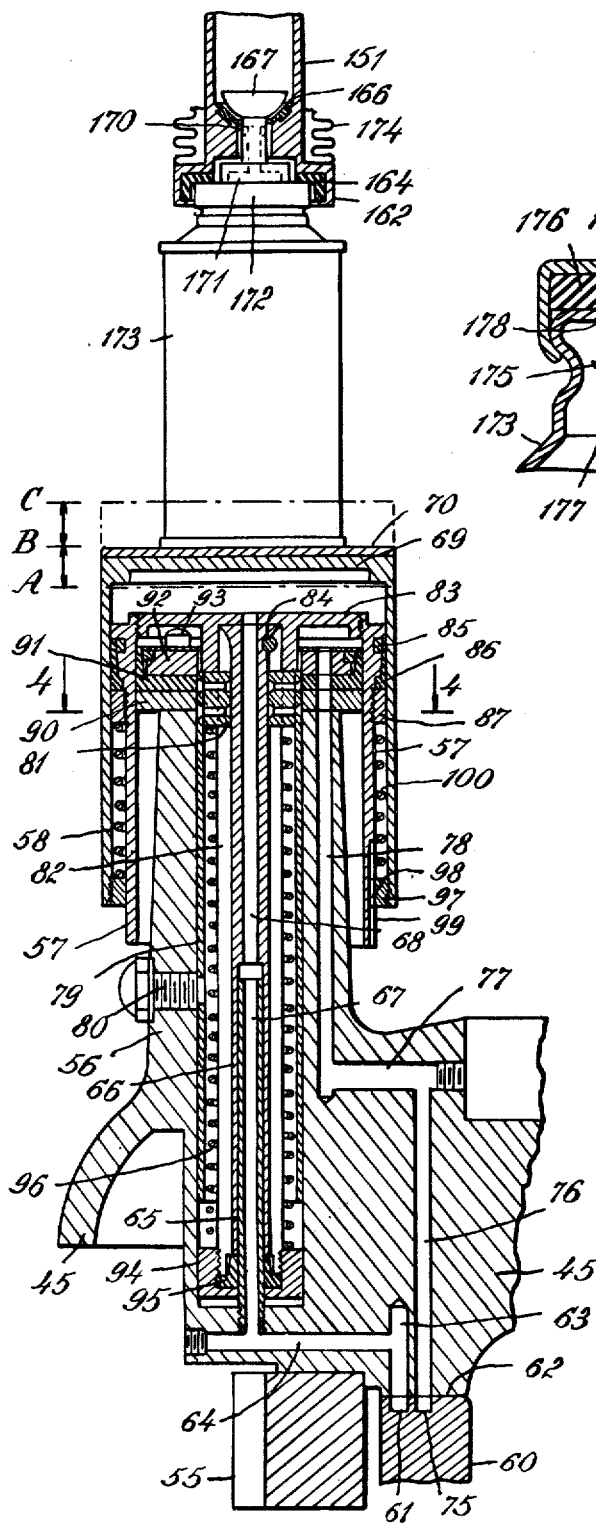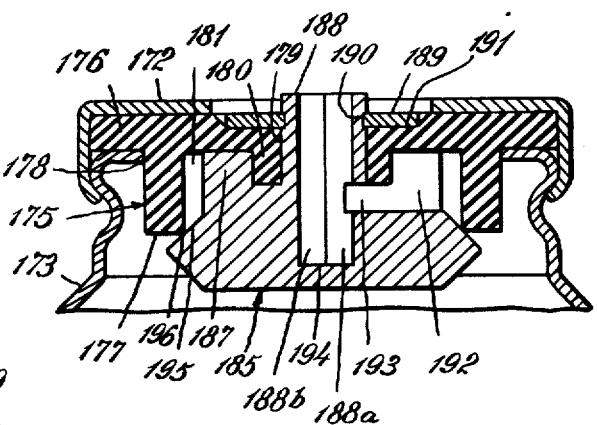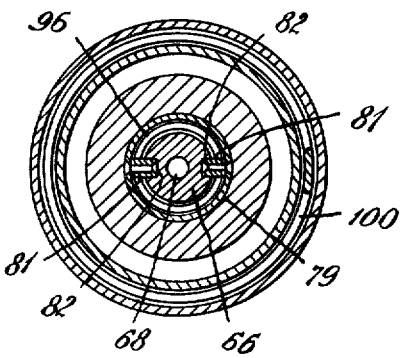

Patented Aug. 28, 1945

2,383,522

UNITED STATES PATENT OFFICE 2,383,522

APPARATUS FOR TREATING LIQUIDS

Charles D. Thoms, New York, N. Y.

Application December 4, 1940, Serial No. 368,440

12 Claims. (Cl. 226—69)

The present invention relates to improvements in apparatus for treating liquids with a gas under pressure, and has for its object certain improvements in apparatus for treating liquids, such as cream, or the like, with gas under pressure so that the liquids will be highly expanded or blended when discharged from their containers.

In the case of cream, specifically, it has been proposed to charge the same with a gas, or a mixture of gases, such as nitrous oxide, carbon dioxide, etc., under pressure in a closed container. The cream dissolves a substantial amount of the gas, and, when the cream is discharged from its container into the open atmosphere, the dissolved gas is suddenly released from solution in minute bubble form, which causes the surrounding cream to expand. In appearance, the expanded cream closely simulates whipped cream made by the conventional method of beating air into the cream. The cream is charged with gas at the present time essentially by hand methods, the containers being frequently cleaned and sterilized in rather haphazard fashion. This leaves much to be desired in the way of low cost quantity production and sanitation.

The present invention contemplates improvements whereby the cream may be readily and economically placed in containers and charged with gas with the practical elimination of sanitary problems.

The invention will be better understood by referring to the accompanying drawings, taken in conjunction with the following description, in which Fig. 1 is a diagrammatic representation of apparatus illustrative of a practice of the invention, showing a combination of a container filler, crowner and gasser;

Fig. 2 is a vertical section in part of the gasser on the line 2—2 of Fig. 1;

Fig. 3 is an enlarged sectional elevation of a part of the container supporting, positioning and shaking means;

Fig. 4 is a section on the line 4—4 of Fig. 3;

Fig. 5 is a still further enlarged sectional elevation of a portion of the device shown in Fig. 3;

Fig. 5a is an additional enlarged sectional elevation of the top of the container shown in Fig. 5;

Fig. 6 is an enlarged plan view of one of the elements included in the sealing and valve means in the crown of the container;

Fig. 7 is a sectional view of a nozzle to discharge the contents of the container;

Fig. 8 is a bottom plan view of the discharge nozzle of Fig. 7;

Fig. 9 is a sectional view of the container shown in position for discharging its contents;

Figure 10:
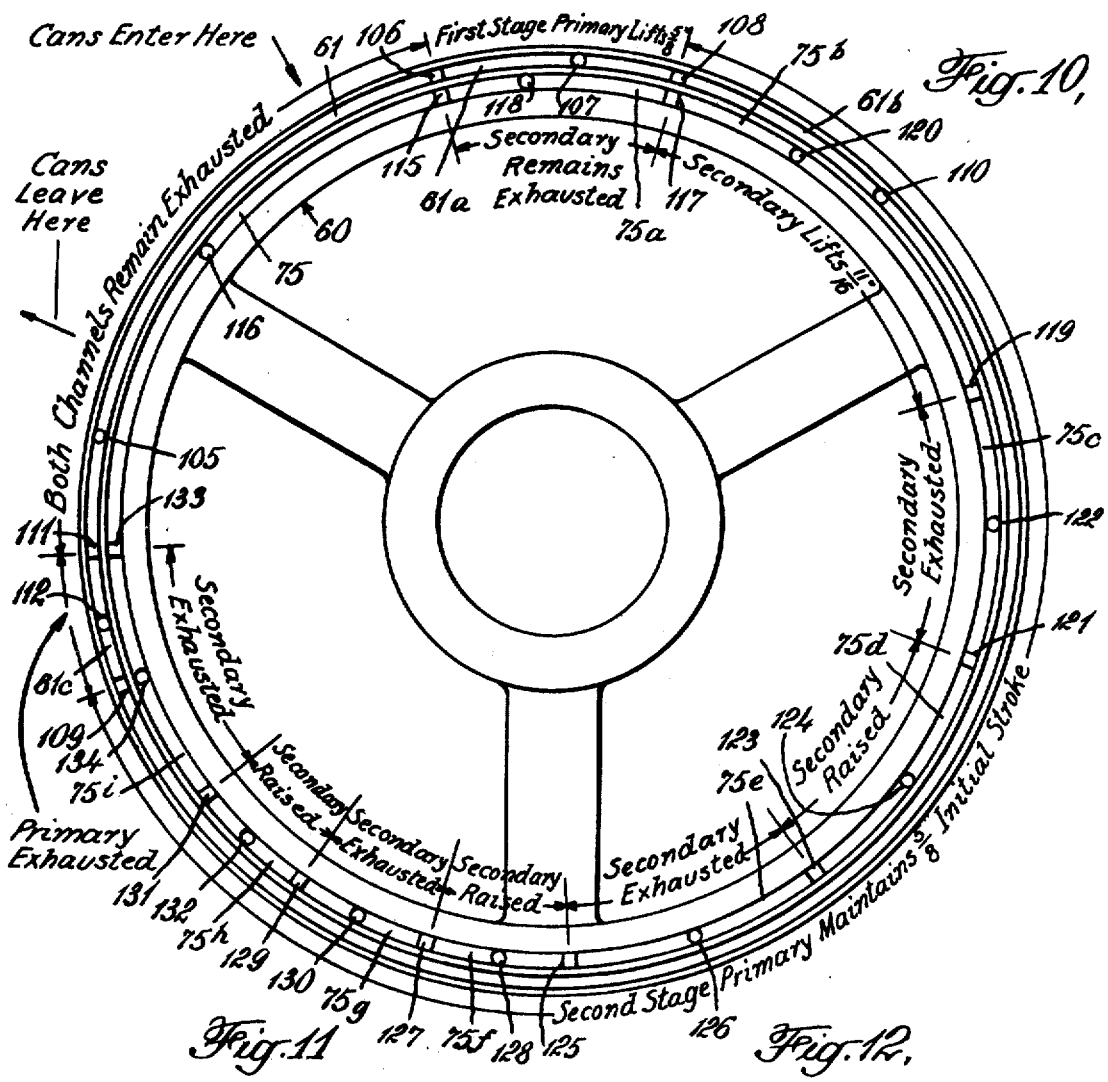
Fig. 10 is a plan view of the stationary ring of Figs. 2 and 3.

Referring to Fig. 1, the apparatus shown comprises a traveling conveyor 20, a notched conveyor wheel 21, a guide plate 22, a filling device 23, a second notched conveyor wheel 24, a crowning device 25, a third notched conveyor wheel 26, a gas-charging device 27, conveniently referred to as a gasser, a fourth notched conveyor wheel 28 and an accumulating table 29. The conveyor, preferably of the endless type, terminates at or near the first notched conveyor wheel 21 which is attached to and supported by a vertically disposed central shaft 30. The conveyor wheel is notched as shown in order to transfer containers from the conveyor to filler 23; and the direction of the containers is controlled in part by a curved wall 31 attached to the guide plate 22. The containers travel in the direction of the various arrows.

The filler device 23 comprises a carrier ring 32 attached to and supported by a vertically disposed shaft 33; and a plurality of equally disposed pistons 34, 34', 34'', etc., each of which is adapted to support a container. The second notched conveyor wheel 24 is attached to and supported by a vertically disposed central shaft 35, and is shaped as shown to transfer filled containers from the filler 23 to the crowner 25. The direction of the filled containers is controlled by a curved wall 36 attached to the guide plate 22.

The crowner 25 comprises a carrier ring attached to and supported by a vertically disposed shaft 37. The crowner is also provided with a plurality of equally spaced supports 38. The third notched conveyor wheel 26 is attached to and supported by a vertically disposed shaft 39 and is notched like the other conveyor wheels in order to transfer containers from the crowner to the gassing device 27, in the direction of the arrows by means of a curved wall 40 attached to the guide plate 22.

The filler and crowner are not described in detail, because such devices are well-known in the art; and no claim is made to them per se in this application. What is not old, however, so far as I am aware, is the gasser 27, taken alone or in combination with other devices, such as those just mentioned. The gasser comprises a carrier ring or rotor 45 attached to and supported by a centrally disposed shaft 46. The carrier ring is provided with a plurality of container supports 47, 47', 47'', etc., equally and circumferentially spaced about the shaft. The fourth notched conveyor wheel 28 is attached to and supported by a centrally disposed shaft 48, and is constructed like the other notched wheels; so as to be adapted to convey containers from the gasser to the accumulating table 29, in the direction of the arrows, along a curved wall 49 attached to guide plate 22.

Referring to Figs. 2 and 3, which show details of the gasser, it is seen that the shaft 46 is provided at its lower end with a ring gear 55. This gear advantageously meshes with gears, not shown, attached to the shafts 39, 37, 35, 33, 30 and 48 in a predetermined time relation in order to regulate the speed of travel of the containers around the path just described. The gear attached to the shaft 33 of the filler 23, or any other appropriate gear, is connected with a source of power, not shown.

Referring for the moment to Fig. 2, the carrier ring or rotor 45 is shown provided with a plurality of spaced hollow upright supports, two of which, 56 and 56', are shown. As shown in that figure and in Fig. 3 each of the hollow uprights support an inner piston 57; and the inner piston in turn supports an outer piston 58.

The outer piston system comprises a stationary ring 60, within the ring gear 55, attached to and supported by the shaft 46. The stationary ring is provided with a plurality of air inlet and air outlet channels 61, 61a, 61b, etc. The stationary ring, which will be described in greater detail below, is in sliding and substantially non-leaking contact along the face 62 with the carrier ring or rotor 45. A vertical conduit 63 is located in the base of the rotor 45, to make connection with the channels 61, 61a, 61b, etc.; and a lateral conduit 64 extends from the vertical conduit. An inner vertical cylindrical sleeve 65 is screwed into the base of the rotor, below the hollow upright 56, and extends upwardly in the hollow upright a substantial distance; and in turn within an outer vertical cylindrical sleeve 66, which forms part of the inner piston 57. The inner sleeve 65 forms a conduit 67, which in turn connects lateral conduit 64 with the conduit 68 of the outer sleeve 66. The upper end of conduit 68 communicates with the inside of the outer piston head 69 secured to the outer piston 58. The outer piston head is in turn provided with a wearing plate 70 on its top, on which the containers are placed and removed.

The inner piston system 57 comprises a plurality of inlet and outlet channels 75, 75a, 75b, etc., in the stationary ring 60 (described more fully below). A vertical conduit 76 extends upwardly in the base of the carrier ring or rotor 45, connecting at its upper end with a lateral conduit 77 in the base, which in turn connects with a vertical conduit 78 extending through the side wall of the upright hollow support 56.

The interior of the upright hollow support is provided with an inner sleeve 79 which is secured thereto by means of a threaded stud 80. The upper end of the inner sleeve is riveted to a pair of juxtaposed keys 81 located in grooves 82 in the outer vertical cylindrical sleeve 66 (see Fig. 4). The upper end of the outer vertical cylindrical sleeve 66 has fastened to it an inner piston head 83 by means of a pin 84, the piston head being threaded or otherwise fastened to piston 57. Piston 57 is provided with a piston ring 85; and a packing ring 86. A threaded ring 87 maintains the packing ring in sliding contact with the inner wall of outer piston 58. Mounted onto the upper end of hollow upright support 56 is an annular base plate 90, packing 91, and an annular top plate 92, which are secured to the hollow upright support by means of bolts 93. The packing 91 and base plate 90 form a sliding support for the inner piston 57.

Threaded onto the lower end of the outer vertical cylindrical sleeve 66 is a collar 94 holding packing 95 against the inner sleeve 65. Between the keys 81 above and the collar 95 below is a coiled tension spring 96, which is adapted to return the inner or secondary piston 57 to its neutral, or inoperative, position. The outer or primary piston 58 has a ring 97 threaded to its lower end, which is provided with a key 98 located in a groove 99 in the inner piston 57; which prevents the outer piston 58 from turning. Between the ring 87 and the ring 97 is a coiled tension spring 100 which is adapted to return the outer or primary piston 58 to its neutral, or inoperative, position.

Referring to Fig. 10, the stationary ring 60, as indicated above, is provided with a plurality or series of spaced air inlet and outlet channels 61, 61a, 61b, etc., and 75, 75a, 75b, etc., which communicate, respectively (see Fig. 3) with conduits 63 and 76 in the base of the carrier ring or rotor 45. The filled and crowned containers are moved onto the carrier ring or rotor 45 in a position above channel 61, having an exhaust outlet port 105. The channel is separated from the next channel 61a by means of a wall 106. The channel 61a is provided with an air inlet port 107, and extends from wall 106 to wall 108. The next channel 61b extends from wall 108 a substantial distance around the ring to a wall 109, being provided with an air inlet port 110. The next channel 61c extends from the wall 109 to a wall 111, and is provided with an air exhaust port 112. The initial channel 61 extends from wall 111 to 106, and, as noted above, is provided with an exhaust outlet port 105. These channels, which may be referred to as the primary channels, are positioned circumferentially so that they may (see Fig. 3) be readily aligned with conduit 63 in the base of the carrier ring or rotor 45.

Still referring to Fig. 10, it will be seen that channel 75 extends to partition wall 115 and is provided with an air exhaust port 116. This channel, it will likewise be noted, is adjacent to channel 61, and is therefore also located directly below the place of entry of the filled containers on the carrier ring or rotor 45. The next channel 75a extends from wall 115 to wall 117, and is provided with an air exhaust port 118. The next channel 75b extends from wall 117 to wall 119, and is provided with an air inlet port 120. In similar fashion, a plurality of alternating air exhaust channels and air inlet channels extend circumferentially around stationary ring 60. The last channel 75i in the series is defined by partition walls 131 and 133; and is provided with an exhaust port 134; the latter wall, together with wall 115, defining the initial channel 75, which as noted above, is provided with air exhaust port 116. All of these channels, which may be referred to as the secondary channels, are positioned circumferentially so that they may be readily aligned (see Fig. 3) with conduit 76 in the base of the carrier ring or rotor 45.

Next, referring to Fig. 2, the apparatus shown comprises a gas inlet 140 connected to a source of gas, not shown. The gas inlet in turn connects with a swivel joint 141 secured to an outer shell or dome 142. A conduit 143 depends from the swivel joint, and is supported in packing 144 in a packing box 145 which is secured to a plate 146 mounted on shaft 46. The shell or dome 142 is secured to the plate along its perimeter. The lower end of the conduit 143 in turn connects with a plurality of lateral branch conduits, two of which, 147 and 147', are shown.

The far end of each lateral branch conduit connects with a head 148 having an outer sleeve 149 integrally secured thereto, and a passageway 150 connecting the interior of the sleeve with the branch conduit. An inner sleeve 151 fits within the outer sleeve. A coiled compression spring 152 is located in a housing 153 secured to the top of the head 148. The upper end of the spring bears against the top of the housing while the lower end bears against a piston head 154 secured to a piston rod 155 extending through the head 148. The lower end of the rod is in turn secured to a spider 156 attached to the upper end of the inner sleeve 151, the spider being adapted to permit the flow of gas therethrough.

The lower end of the inner sleeve 151 (see Fig. 5) is provided with a collar portion 161 terminating at its lower end with a charging head 162. The charging head in turn comprises an annular metal collar 163, the interior of which is fitted with a rubber gasket 164 which is held in place by means of a bent-over portion 165 of the metal collar. The collar portion 161 has embedded in it a rubber valve seat 166.

The lower end of the inner sleeve 151 is provided with a valve 167 having a spherical surface 168 adapted to be brought in non-leaking engagement with the rubber seat 166. The spherical surface readily adjusts itself in non-leaking engagement with the valve seat. The lower end of the valve is provided with a hollow stem 169 provided with one or more ports 170. The lower end of the stem is secured to an inverted cup-shaped collar 171, which is adapted to bear against the top of the crown or cap 172 of the container 173. The crown or cap may be attached to the container in any suitable manner, such as by crimping, screwing, etc. As shown (Figs. 2 and 5), the sleeves 149 and 151 are surrounded by a bellows 174, secured at the top and bottom, which expand and contract with the sliding movement of the sleeves and which retain any gas that may escape between the sleeves.

Referring to Fig. 5 and particularly to Fig. 5a, the crown 172 of the container 173 is provided with a valve containing an annular rubber gasket 175, shaped as shown. It comprises an annular top portion 176 adapted to fit snugly into the crown 172 when the crown is secured to the container. An annular, vertically depending, rim or wall portion 177 extends downwardly from the annular top portion immediately adjacent to the opening 178 of the container. The center of the annular rubber gasket 175 is provided with a central opening 179 defined by an annular depending flange 180 forming a part of the gasket proper and which is adapted to provide a free space 181 between the flange 180 and the wall 177.

The valve is also provided with a valve seat body 185 made of suitable material, such as a plastic or metal. The valve-seat body is provided with an annular shoulder portion 187 fitting within the open space or race-way 181. The valve seat body is secured to the annular rubber gasket 175, and is also provided with a vertically extending cylindrical portion 188 integrally attached thereto and adapted to fit snugly in the central opening 179 provided by the annular depending flange 180 of the rubber gasket. The vertically extending hollow member 188 protrudes a convenient distance above the gasket, the portion thereof immediately above the flange 180 being provided with a sprung washer 189, which on installation bites an annular groove 190 into the wall of the hollow member into which the washer snugly fits, so that the gasket is securely held against the valve seat body 185 in a sealed or non-leaking position. Attaching the sprung washer in this manner also forces an annular depression 191 in the gasket, so that the top of the washer is substantially flush with the top of the gasket and the valve-seat body and gasket are fastened together.

The annular shoulder 187 of the valve-seat body 185 is provided with an open trough 192 (see Fig. 6), the lower portion of which connects with a conduit 193 which in turn connects with the passageway 194 in the vertically extending hollow member 188. As shown in Fig. 6, this groove extends downwardly from the top of the annular shoulder 187. The valve-seat body has a tapered or bevelled seat 195 which is normally in circumferential contact with the inside corner ring 196 of the annular depending wall 177 of the rubber gasket 175, thus assuring a perfect seal.

Referring to Fig. 6, it will be seen that the interior of the vertically-extending hollow member 188 of the valve has an irregular design in cross-section, the one-half portion 188a being V-shaped, and the other half-portion 188b being semi-circular in shape. This design is employed so that the hollow member will always accommodate a discharge nozzle 197 in a predetermined position to permit the operation of the valve, and to permit the discharge of the contents of the container. To this end (see Figs. 7 and 8), the lower portion of the nozzle 197 has a substantially similar but slightly smaller design in cross-section, so that the lower portion of the nozzle may be readily fitted into the interior of the vertically extending hollow member 188. The lower end of the nozzle has a notched-away portion or opening 198, which is automatically positioned in front of the conduit 193, connecting with the open trough 192 of the valve, when the nozzle is inserted in the hollow member. The nozzle is also provided with a lateral member or thumb rest 199 integrally attached thereto an appropriate distance from the bottom, to assure sufficient clearance above the crown of the container, so that when the lateral member or thumb rest is pressed (see Fig. 9) toward the crown, a portion of the tapered or bevelled seat 195 of the valve is pushed away from the inside corner rim 196 of the annular depending wall 177 of the rubber gasket 175, thus breaking the seal to provide an opening 200; and permitting the contents of the container, which are under pressure, to escape through the opening 200, trough 192, conduit 193, and the passageway 201 of the nozzle to the outside atmosphere.

The apparatus just described may be operated as follows in the practice of the method of the invention:

For a general resume of the method, reference is first made to Fig. 1. The conveyor 20 is loaded with a plurality of containers 173 placed in tandem, and the apparatus is set in motion. As the conveyor moves toward the first notched conveyor wheel 21, one of the notches takes a container and pushes it along the curved wall 31 on the guide plate 22, toward and onto the piston 34 of the filler 23. The next notch takes the next container, and moves it onto the piston 34'. In similar fashion, one container after the other is transferred from the traveling conveyor to the filler.

A predetermined amount of cream 205, for example, 17½ oz., is fed into each container as it moves clockwise around the vertically disposed shaft 33. By the time the container reaches the second notched conveyor wheel 24, the required amount of cream has been introduced. For purposes of the invention, the container is only partially filled, say to the level 206, thereby leaving a free space 207 immediately above the cream, which is adapted to receive and hold gas under pressure (see Fig. 5).

The second notched conveyor 24 transfers the partially filled containers from the filler 23, along the curved wall 36 on the guide plate 22, to the spaced supports 38 of the crowner 25. As the containers are passed clockwise around the vertically disposed shaft 37, a crown or cap 172, provided with a valve as described above, is clamped onto the neck portion of the container so as to seal the container effectively. The crowning operation is completed by the time each container reaches the third notched conveyor wheel 26, which transfers the crowned containers along the curved wall 40 on guide plate 22 to and onto supports 47, 47' of the gasser 45.

As the partially filled and crowned containers move clockwise around the centrally disposed shaft 46, a predetermined amount of gas is introduced into the container. Simultaneously therewith, the container and its contents are violently shaken so that a substantial amount of the gas is promptly dissolved by the cream. While any suitable gas pressures may be employed during this part of the operation, some regard must be had for the pressure the containers are able to withstand. Containers of the conventional tin-can variety, such as are employed for the dispensing of beer to the public, are adequate for the purposes of the present invention, when the gas is introduced within a safe optimum pressure range. The cans are capable of standing a shock pressure of 150 lbs. per square inch. Gas introduced at a pressure of 120–130 lbs. per square inch, while the containers are violently shaken, is well within the safety range.

By the time the containers reach the fourth notched conveyor wheel 28, they have been shaken, for example, for about six seconds; and are adequately charged with a predetermined amount of gas, for example, 10–11 grams. The notched conveyor wheel then successively grasps the containers and moves them along the curved wall 49 on the guide plate 22 onto the accumulating table 29; thus completing the circuit. On reaching the accumulating table the cans may, for example, be under about 120 lbs. per square inch pressure. The containers may then be handled in any desired manner to prepare them for distribution to the public. The pressure may drop gradually to about 85 lbs.

As previously noted, the method of filling and crowning containers is not essentially new, although, as far as I am aware, its application to cream, or to other liquids for expansion or emulsion purposes, is new. This is particularly true of the steps of gassing and shaking. They will now be described in somewhat greater detail.

When the third notched conveyor wheel 26 transfers the partially filled and crowned containers from the crowner to the gas charging device or gasser, it will be noted on referring to Figs. 2 and 3 that they are in fact moved onto the wearing plate 70 attached to the top of the outer piston 58 (forming a part of the support 47, Fig. 1).

Now, referring to Fig. 10, and specifically to the legend "Cans enter here" at the upper left hand corner, it will be appreciated that the stationary ring 60 is in such a position that when each can or container is moved onto the wearing plate 70 of the outer piston 58 (Figs. 2 and 3), primary air channel 61 and secondary air channel 75 of the stationary ring 60 are under exhaust. This means that both the outer piston 58 and the inner piston 57 (see Fig. 3) are in their normal, inoperative or low position. This brings the wearing plate 70 on substantially the same level as the guide plate 22, so that the third notched conveyor wheel 26 may readily transfer the partially filled and crowned containers to the wearing plate.

As the carrier ring or rotor 45 moves in a clockwise direction about its centrally disposed shaft 46, primary conduit 63 of the rotor is moved across channel 61, wall 106, to channel 61a. When over the latter channel, air under pressure coming through the inlet port 107 is permitted to move upwardly through primary conduits 63, 64, 67 and 68 to the outer piston head 69. This air is under sufficient pressure to cause the outer piston head 69 to rise a predetermined distance, from point A to point B (see Fig. 3). The distance of this upward movement is sufficient to raise the container 173 into non-leaking engagement with the gas charging head 162 (see Figs. 3 and 5). If reference is made to Fig. 2, it will be seen that the container 173 at the left is at the normal level, just prior to the raising of the outer piston head 69, thus leaving a free space 210 between the crown of the container and the gas charging head 162. The container 173 at the right of Fig. 2 is shown, however, in elevated position, so that the crown of the container is fitted into the gas charging head in non-leaking engagement.

Figure 11:
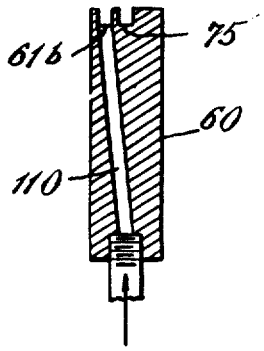
Fig. 11 is a sectional elevation through the stationary ring, showing means of applying air for positioning and shaking the container.
Figure 12:
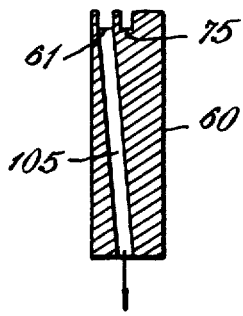
Fig. 12 is a typical sectional elevation through the stationary ring showing the means of exhausting the air.

The primary air thus employed is under sufficient pressure to keep the crown of the container in non-leaking engagement with the gas charging head 162. That pressure is maintained as the primary conduit 63 in the base of rotor 45 continues across channel 61b which terminates at the wall 109 (see Fig. 11). As the crown of the container is pushed upwardly into the gas charging head, the inner sleeve 151 may be moved slightly upwardly. This movement in turn causes the piston head 154 to move slightly upwardly against the coiled compression spring 152.

The shaking action above referred to will now be described.

As the primary conduit 63 in the base of rotor 45 (Fig. 3) passes over the air inlet channel 61a, the secondary conduit 76 in the base of the rotor passes over exhaust channel 75a (Fig. 10). When, however, primary conduit 63 begins to cross over air inlet channel 61b, secondary conduit 76 passes over air inlet channel 75b. The secondary air introduced through the air inlet port 120 in channel 75b is at a pressure greater than that of the primary air introduced through air inlet port 110 in channel 61b so that as the secondary air rises through conduits 76, 77 and 78 in the base of rotor 45 (Fig. 3), the inner piston 87 forces the inner piston head 83, as well as the outer piston head 69, upwardly. Piston head 69 is thereby moved from point B to point C.

In other words, the primary air system moves the outer piston head 69 from point A to B, and maintains it at the level of point B. The secondary air system, however, forces the outer piston head 69 from point B to point C, a substantial distance higher. The distance from point A to point B may, for example, be about 5/8 inch, and the distance from point B to point C about 1 1/2 inch.

When the rotor 45 in its rotation brings the secondary air conduit 76 over (see Fig. 10) the wall 119 and across secondary channel 75c, the secondary air is exhausted through exhaust port 122. The outer piston head 69 then drops from point C to point B, at which level it is suspended or maintained by the pressure of the primary air that continues to be exerted against the interior of the head. Next, when the secondary conduit 76 of the rotor 45 passes over the wall 121 and across secondary channel 75d, secondary air rising through inlet port 124 finds its way through the secondary air system, and again forces outer piston head 69 from point B to point C.

In similar fashion, when secondary conduit 76 passes the wall 123 and crosses secondary channel 75e, the secondary air is exhausted from the system through port 126; and the outer piston head 69 again drops from point C to point B. This up and down, or shaking, movement of the outer piston head, which supports the container and its contents, may be made to occur in this fashion as often as is desirable. The intervals of shaking may be varied in time by varying the lengths of the air inlet and outlet channels in the stationary ring 60 of the secondary air system. Also, the distance from point B to point C, through which the outer piston head rises and falls during the shaking operation, may be varied so as to obtain the desired agitation of the cream to assure the solution of the gas therein.

As the outer piston head 69 rises from point B to point C (see Fig. 2), the inner sleeve 151 rises in the outer sleeve 149, and the piston head 154 is moved a corresponding distance against the coiled compression spring 152. As the outer piston head 69 drops from point C to point B, the coil compression spring forces the inner sleeve 151, and therefore the gas charging head 162, downwardly in non-leaking or sealed contact with the crown or cap 172 on the container. The compression spring is sufficiently strong to counterbalance the pressure of the primary air system when the outer piston head is forced to point B, and also to keep the gas charging head 162 in non-leaking contact with the crown or cap 172 during the up and down movements of the piston head 69 from point B and point C.

By the time the outer piston head 69 reaches point B from point A, it is not only in non-leaking engagement with the charging head 162, but a sufficient upward thrust on the inverted cup-shaped collar 171 is exerted by the crown or cap 172 of the container so as to raise the valve 167 away from its rubber seat 166 to form an open annular space 211 (Fig. 5), through which (Fig. 2) gas 212 coming through gas inlet 140, conduit 143, lateral branch conduit 147, and passageway 150, may pass (Fig. 5) through the port or ports 170 into the interior of the hollow stem 169, and thence through the passageway 194 within the vertically extending cylindrical portion 188 of the crown or cap valve 185. The pressure of this gas is sufficiently high to push the inside corner rim 196 of the depending rim or wall 177 of the annular rubber gasket 175 away from the tapered or bevelled seat 195 of the valve to provide an open space 213 through which the gas finally passes into the interior of the container. The gas continues to have access to the interior of the container as the outer piston head 69 moves up and down between point B and point C.

As a result of the movements just described, the cream 205 in the container 173 is violently agitated or shaken while the gas is fed under pressure into the container. Due to the violent agitation, the gas is more readily dissolved by the cream. As the initial gas goes into solution in the cream, additional gas is fed into the container. Due to this simultaneous action, a substantial amount of gas is introduced into the container without building up dangerous pressures. The cream takes up the gas more readily when cold. For that reason, it is desirable to fill the containers with cream that has been suitably chilled.

When the secondary conduit 76 of the rotor 45 (Fig. 3) passes over the secondary channel 75h (Fig. 10), secondary air coming through inlet port 132 raises the outer piston head 69 from point B to point C for the last time during a single complete revolution of the rotor. Then, when the secondary conduit 76 passes over the secondary channel 75i, the secondary air is exhausted through outlet 134, and the outer piston head drops from point C to point B. The secondary conduit 76, in the instant design, passes over to the initial secondary exhaust channel 75. The primary conduit 63 of the rotor 45 passes over primary exhaust channel 61c as the secondary system is being exhausted. This causes the outer piston head 69 to drop from point B to A. When, therefore, primary conduit 63 passes over primary channel 61, and secondary conduit 76 passes over secondary channel 75, both systems are under exhaust, and the outer piston head 69 remains at point A. During this interval, the gas-charged containers are successively grasped by the fourth notched conveyor wheel 28, and transferred from the gasser to the accumulating table 29. This completes the trip of a container from the conveyor, the filler, the crowner and the gasser; and the cycle continues with succeeding containers.

After the containers have been charged with gas, a suitable cap (not shown) is placed over the crown of the container, in order to keep its exposed valve parts clean. A paper or Cellophane cap, such as is conventionally employed on milk bottles, may be used for this purpose; particularly the type of paper cap that extends across the top and around the bottle neck, the paper being secured to the neck by means of a piece of wire, the ends of which are twisted together.

In order to use a container charged with cream, the paper cap is removed, and the discharge nozzle 197 is inserted in the passageway 194 of the vertically extending cylindrical portion 188 of the crown valve 185 (see Fig. 9). The user then grasps the container and inverts it to discharge the cream as expanded or whipped cream. To this end, the user's thumb or finger is then pressed against the lateral member 199. This causes the tapered or bevelled seat 195 of the valve 185 to separate from the inside corner rim 196 of the depending rim or wall portion 177 of the annular rubber gasket 175, to form a free or open space 200. The cream, being under considerable pressure in the container, instantly rushes through the open space 200 and passes through the open trough 192, the conduit 193, the notched-away portion or opening 198, into and through the passageway 201 of the discharge nozzle. On reaching atmospheric pressure, the gas dissolved in the cream is instantly released from pressure, and goes out of solution. This causes a marked expansion of the cream. The surface tension of the cream is such that a myriad of minute bubbles of the gas is formed and the bubbles are in great part retained in the cream, which causes to to expand and to persist as whipped cream.

The cream may be discharged in whole or in part from the container. If only in part, the container is preferably returned to a refrigerator to await further use. When it has served its purpose, the container, being relatively inexpensive, is thrown away or otherwise discarded.

While the practice of the invention has been illustrated with respect to the treatment of cream, it will be clear to those skilled in this art that the invention is also applicable to the treatment of other liquids with gas under pressure, such as ice-cream mixes; hair-setting lotions; whipped cream toppings and parfait type desserts containing flavoring extracts, jellies, fruit juices, crushed fruits, nuts, wines, spirits, etc.; drinks of various kinds, such as milk, malted milk, milk shake, coffee milk shake, coffee, chocolate, etc.; canapé spreads; omelets; scrambled eggs; sauces of various kinds; prune whip; griddle cake and waffle batters; salad dressings, such as whipped mayonnaise, French dressing, etc. In the case of two or more liquids such as French dressing, the process of the invention makes it possible to produce a substantially perfect blend of the oil and acid ingredients, as well as the seasoning and condiments, even though the dressing is not discharged from its container in highly expanded form.

It will likewise be clear to those skilled in this art that the various elements going into the apparatus are so proportioned that, when the apparatus is in operation, its moving parts are synchronized to advance the containers smoothly and efficiently from step to step in the process; that the speed at which the containers are advanced through the apparatus may be accurately controlled and maintained; and that the specific apparatus and method shown and described are merely illustrative of the invention.

I claim:

1. An apparatus for filling and confining liquid in a container with a suitable gas under pressure comprising a filling-device for partially filling the container through its opening with a predetermined amount of the liquid, a crowning-device for sealing the opening of the container with a crown provided with a valve, an automatically closing support adapted to hold the sealed container, gas-charging means for passing the gas through said valve into the container, and shaking-means associated with the support for mechanically agitating the container and the liquid while the gas is introduced, and terminating-means for stopping the charging of the liquid with the gas when the gas has been introduced into the container for a predetermined time.

2. Apparatus according to claim 1, in which advancing-means are associated with the filling-device for progressively moving the container forward while being filled with the liquid.

3. Apparatus according to claim 1, in which advancing-means are associated with the crowning-device for progressively moving the container forward while its opening is sealed with said crown and valve.

4. Apparatus according to claim 1, in which advancing-means are associated with the shaking-means for progressively moving the container forward while being charged with the gas and mechanically shaken.

5. Apparatus according to claim 1, including advancing-means for progressively moving the container forward substantially continuously while being filled with the liquid, sealed with the crown and valve, and charged with the gas and mechanically shaken.

6. In apparatus for treating liquid, confined in containers, with a suitable gas under pressure, the improvement comprising a support adapted to hold a plurality of the containers sealed and partially filled with the liquid, gas-charging means for successively introducing the gas into each container, and shaking-means associated with the support for mechanically agitating each container and the liquid confined therein while the gas is introduced, said shaking-means being adapted successively to provide substantially the same shaking action for each container and contents, and terminating-means for stopping the charging of the liquid with the gas when the gas has been introduced into each container for a predetermined time.

7. An apparatus for filling and confining liquid in containers with a suitable gas under pressure comprising a filling-device for partially filling each succeeding container through its opening with a predetermined amount of liquid, a crowning device for sealing the opening of each container with a crown provided with an automatically closing valve, a container-support adapted to hold the sealed containers, gas-charging means for introducing the gas into each container, shaking-means associated with the container-support for mechanically agitating each container and its liquid while the gas is introduced, said shaking-means being adapted to provide substantially the same shaking action in time and intensity for each container and its contents, and terminating-means for stopping the charging of the liquid with the gas when the gas has been introduced into the container for a predetermined time.

8. In apparatus for treating liquid, confined in a container, with a suitable gas under pressure, the improvement comprising a support adapted to hold a container partially filled with the liquid, gas-charging means for introducing the gas through a vent into the container, means for sealing said vent automatically to confine the gas in the container under pressure, shaking-means associated with the support for mechanically agitating the container and the liquid while the gas is introduced under pressure into the container, advancing-means associated with the support for progressively moving the container while being charged with the gas and mechanically shaken, and terminating-means for stopping the charging of the liquid with the gas.

9. In apparatus for treating liquid in a series of containers of substantially the same size with a suitable gas under pressure, the improvement comprising a filling device for partially filling each container with a predetermined amount of the liquid, a crowning device for sealing the opening of each partially filled container with a crown provided with an automatically closing valve, a support adapted to hold a plurality of the sealed containers, gas-charging means for passing the gas from a common source under pressure into one of the sealed containers in the series through its crown-valve, similar gas-charging means for passing gas from the same source under pressure into a later sealed container in the series through its crown-valve while gas continues to flow into the earlier container, similar gas-charging means for passing gas from the same source under pressure into a still later sealed container in the series through its crown-valve while gas continues to flow into the two earlier containers, and shaking means associated with the support for mechanically agitating each container and its contents for a predetermined interval of time and at a predetermined intensity while the gas is being introduced therein to effect the desired reaction between the liquid and the gas, and terminating-means for stopping the introduction of gas into each container in the series when the gas has been thus introduced for a predetermined time.

10. Apparatus according to the preceding claim comprising means for progressively advancing the containers in their relative positions as they are charged with the gas and shaken.

11. An apparatus for receiving empty containers and conveying them therethrough while they are being filled with a liquid and the liquid is confined in the container under a gaseous pressure, comprising a filling device for partly filling each container with a predetermined amount of liquid, a crowning device, located beyond the filling device in the path of travel of containers through the apparatus, for applying to each container passing through the apparatus a crown having an opening therethrough which automatically is closed by a valve, and means, located beyond the crowning device in the path of travel of containers through the apparatus, for passing gas under pressure into the containers through the passage in the crowns, and means for discontinuing the passage of gas into a container after a predetermined time.

12. An apparatus for receiving empty containers and conveying them therethrough while they are being filled with a liquid and the liquid is confined in the container under a gaseous pressure, comprising a filling device for partly filling each container with a predetermined amount of liquid, a crowning device, located beyond the filling device in the path of travel of containers through the apparatus, for applying to each container passing through the apparatus a crown having an opening therethrough which automatically is closed by a valve, and means, located beyond the crowning device, in the path of travel of containers through the apparatus, for passing gas under pressure into the containers through the passage in the crowns, means for discontinuing the passage of gas into a container after a predetermined time, and means for agitating each container while introducing gas thereinto.

CHARLES D. THOMS.

CERTIFICATE OF CORRECTION.

Patent No. 2,383,522.                       August 28, 1945.

CHARLES D. THOMS.

It is hereby certified that error appears in the printed specification of the above numbered patent requiring correction as follows: Page 6, first column, line 64, claim 1, for "a valve, an automatically closing" read --an automatically closing valve, a--; and that the said Letters Patent should be read with this correction therein that the same may conform to the record of the case in the Patent Office.

Signed and sealed this 18th day of December, A. D. 1945.

Leslie Frazer (Seal)                    First Assistant Commissioner of Patents.

liquid, a crowning device for sealing the opening of each partially filled container with a crown provided with an automatically closing valve, a support adapted to hold a plurality of the sealed containers, gas-charging means for passing the gas from a common source under pressure into one of the sealed containers in the series through its crown-valve, similar gas-charging means for passing gas from the same source under pressure into a later sealed container in the series through its crown-valve while gas continues to flow into the earlier container, similar gas-charging means for passing gas from the same source under pressure into a still later sealed container in the series through its crown-valve while gas continues to flow into the two earlier containers, and shaking means associated with the support for mechanically agitating each container and its contents for a predetermined interval of time and at a predetermined intensity while the gas is being introduced therein to effect the desired reaction between the liquid and the gas, and terminating-means for stopping the introduction of gas into each container in the series when the gas has been thus introduced for a predetermined time.

10. Apparatus according to the preceding claim comprising means for progressively advancing the containers in their relative positions as they are charged with the gas and shaken.

11. An apparatus for receiving empty containers and conveying them therethrough while they are being filled with a liquid and the liquid is confined in the container under a gaseous pressure, comprising a filling device for partly filling each container with a predetermined amount of liquid, a crowning device, located beyond the filling device in the path of travel of containers through the apparatus, for applying to each container passing through the apparatus a crown having an opening therethrough which automatically is closed by a valve, and means, located beyond the crowning device in the path of travel of containers through the apparatus, for passing gas under pressure into the containers through the passage in the crowns, and means for discontinuing the passage of gas into a container after a predetermined time.

12. An apparatus for receiving empty containers and conveying them therethrough while they are being filled with a liquid and the liquid is confined in the container under a gaseous pressure, comprising a filling device for partly filling each container with a predetermined amount of liquid, a crowning device, located beyond the filling device in the path of travel of containers through the apparatus, for applying to each container passing through the apparatus a crown having an opening therethrough which automatically is closed by a valve, and means, located beyond the crowning device, in the path of travel of containers through the apparatus, for passing gas under pressure into the containers through the passage in the crowns, means for discontinuing the passage of gas into a container after a predetermined time, and means for agitating each container while introducing gas thereinto.

CHARLES D. THOMS.

---

CERTIFICATE OF CORRECTION.

Patent No. 2,383,522.                              August 28, 1945.

CHARLES D. THOMS.

It is hereby certified that error appears in the printed specification of the above numbered patent requiring correction as follows: Page 6, first column, line 64, claim 1, for "a valve, an automatically closing" read --an automatically closing valve, a--; and that the said Letters Patent should be read with this correction therein that the same may conform to the record of the case in the Patent Office.

Signed and sealed this 18th day of December, A. D. 1945.

Leslie Frazer (Seal)                      First Assistant Commissioner of Patents.